United States Patent Office

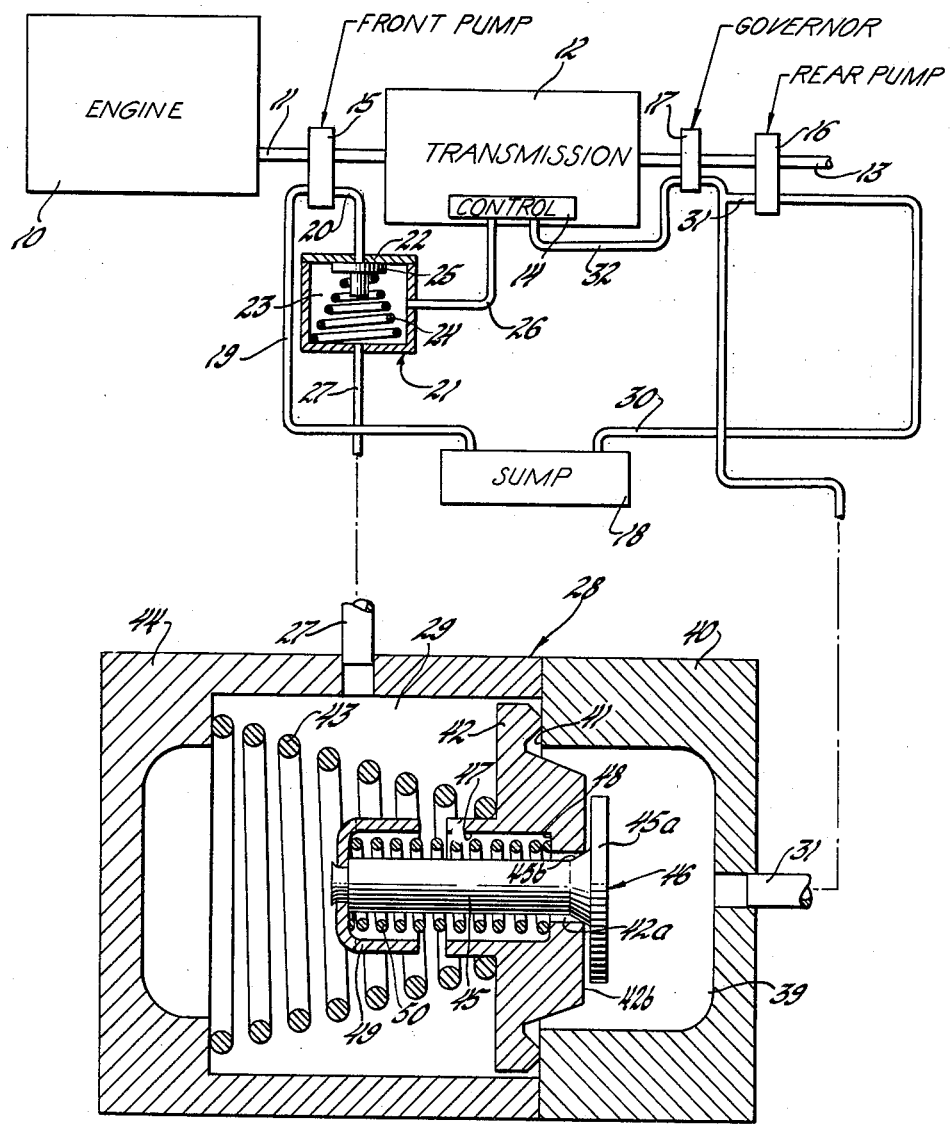

3,107,621
Patented Oct. 22, 1963

3,107,621
FLUID PRESSURE SUPPLY SYSTEM
Leopold T. Szady, Grosse Pointe Woods, Marvin R. Marsh, Birmingham, and Walter K. Fuelberth, Warren, Mich., assignors to General Motors Corporation, Detroit, Mich., a corporation of Delaware
Filed Oct. 17, 1960, Ser. No. 62,937
8 Claims. (Cl. 103—4)

This invention relates to fluid pressure supply systems and more particularly to an improved fluid pressure supply system for a vehicle transmission.

Fluid pressure supply systems incorporating a pair of fluid pressure pumps wherein one pump is engine driven and a second pump is driven by the transmission power delivery shaft have heretofore been employed in connection with automatic transmissions for use in automotive vehicles. In such supply systems, unwanted and undesirable results have been obtained, particularly when the power delivery shaft driven pump is operated in reverse. Under such conditions, the transmission driven pump is operated in a reverse direction with respect to the direction of rotation of the engine driven pump and in systems wherein the front and rear pump both supply pressure to a common delivery passage, the transmission driven pump robs oil supplied to the common delivery passage by the engine driven pump, thereby causing an undesirable drop in pressure in the oil delivery passage. This drop in line pressure may become critical in vehicles which have had considerable use and pump wear to the extent that the front pump may lose capacity such that the rear pump may rob the front pump of sufficient oil to cause the front pump to lose its prime when operating at slow speed in reverse. In such event, the vehicle cannot be operated in forward drive until the front pump again is able to deliver fluid under pressure to the control system. This condition of loss of prime of the engine driven pump particularly arises when backing the car out of a long driveway, whereupon it is impossible to establish forward drive immediately when such drive is called for. In addition, it has been found that the transmission driven pump becomes noisy in reverse operation due to the fact that the pump will draw air into the system which results in a fluctuation of the load applied to the pump gears or teeth and results in considerable chatter and noise. It is likewise undesirable to have the transmission driven pump pump air into the fluid system. Such introduction of air into the system results in bubbling with consequent aeration of the fluid supply in the sump.

An object of this invention is to provide an improved transmission fluid pressure supply system of the type including a pair of pumps wherein a pair of pumps supply fluid pressure to a common delivery passage incorporating a priming valve for delivering fluid to the normal pressure discharge passage of the transmission driven pump when such pump is operated in reverse.

A more particular object of this invention is to provide an improved transmission fluid pressure supply system of the type described incorporating a valve unit for permitting controlled intermittent flow of pressure fluid from the front pump to the normal pressure fluid discharge passage of the rear pump when the rear pump is operated in reverse, and effective upon a predetermined rise of pressure in the normal discharge passage of the rear pump to close to thereby prevent further fluid flow from the front pump to the rear pump.

These and other objects and advantages of this invention will be apparent from the following description and claims in conjunction with the accompanying drawing in which the single FIGURE is a schematic diagram of the fluid supply system illustrating the valving positions when the vehicle is stopped with the engine turned off.

Referring to the figure there is shown an engine 10 for driving a power input shaft 11 of a transmission 12. A transmission power delivery shaft 13 may be operated at various forward drive ratios, reverse, or neutral condition of operation as determined by the condition of operation of transmission 12. Shaft 11 always rotates at engine speed in one direction. Shaft 13 may, for example, be driven in low, intermediate or direct drive, reverse, or may not be driven at all if transmission 12 is in neutral with the vehicle stopped. An automatic valve control box 14 may control the transmission drive ratio in a conventional manner.

Fluid under pressure for control purposes is supplied to control box 14 by means of a front pump 15 driven by shaft 11 and a rear pump 16 driven by shaft 13. A hydraulic governor 17 is also driven by shaft 13, the governor being of conventional design. Pump 15 draws fluid from a sump 18 through a suction passage 19 and delivers the same under pressure to a passage 20 leading to a front pump check valve indicated generally at 21.

Pump 15 is provided with a line pressure regulator valve (not shown) which functions to maintain a predetermined normal range of line pressure in passage 20, for example, 40 to 75 pounds per square inch when operating in forward drive. The line pressure regulator valve is controlled in a conventional manner to maintain a higher range of pressures in passage 20, for example 75 to 140 pounds when operating in reverse. Such pressure regulator valves per se are well known in the art and accordingly need not be shown in detail in the present application.

Front pump check valve housing 22 forms a chamber 23 having a spring 24 yieldably biasing a valve member 25 towards a position wherein passage 20 is blocked off from chamber 23. Chamber 23 is connected to control 14 by means of a passage 26 and is connected to a chamber 29 of a valve unit 28 by a passage 27.

Rear pump 16 draws fluid from sump 18 through a suction passage 30 and delivers the fluid under pressure to a governor pressure supply passage 31. Governor 17 delivers variable governor pressure to control 14 through governor delivery passage 32. Pressure in passage 32 will vary with vehicle speed as determined by the speed of rotation of shaft 13 and increases with increase of vehicle speed. Pressure in passage 32 is used to control the transmission drive ratio in a conventional manner.

Passage 31 is connected to a chamber 39 of valve unit 28.

Valve unit 28 includes a housing portion 40 providing an annular shoulder 41 forming a valve seat for a valve member 42. A relatively heavy spring 43 disposed in chamber 29 is seated upon a housing portion 44 of valve unit 28 and upon valve member 42 to normally bias valve 42 into contact with spring seat 41. Valve 42 is drilled at 42a to receive a valve stem 45 of a valve 46 having a head 45a disposed in chamber 39. Valve 42 is drilled at 47 to a larger diameter than that of opening 42a at 46 to provide a shoulder 48 at the juncture of openings 42a and 47. A spring seat 49 is secured to the end of valve stem 45, there being a relatively light spring 50 seated upon seat 49 and shoulder 48 to yieldably bias valve 46 to its closed position. A cone shaped valve portion 45b joins stem 45 to head 45a. Cone 45b contacts the sharp corner of drilled opening 42a in its seated position such that head 45a is spaced from the wall 42b of valve 42 when valve 46 is closed.

Front pump 15 is preferably a gear type pump and rear pump 16 is preferably a gear type pump. Suitable line pressure regulator valves, not shown, may be employed to control the pressure of fluid delivered to passages 20 and 31 by the pumps. As heretofore stated, the pressure delivered to passage 20 by pump 15 when operating in forward drive will be approximately one-half the pressure delivered to passage 20 by pump 15 when operating in reverse drive. Pumps 15, 16 and governor 17 are positioned above the level of oil in sump 18 in the assembly, and due to variation of dimensional limits and tolerances permitted in the component parts of the pumps and governor, it has been found that pump 16 and governor 17 tend to draw air into the fluid system when the shaft 13 is operated in reverse. This is undesirable and objectionable because it results in aeration of the fluid in sump 18 and variation and fluctuation of the loading of the pump gear teeth with a consequent gear clatter. To prevent pump 16, when operating in reverse, from unduly robbing passages 27 and 31 of fluid and also to more effectively prevent gear clatter and fluid aeration, the rear pump check valve 42 and bleed valve 46 are provided.

In reverse operation, it is highly important that passage 31 be supplied with fluid and not be permitted to become filled with air. It has been found that with passage 31 filled with air that front pump 20 may lose its prime and be unable to immediately supply fluid for forward drive upon shifting from reverse to forward.

In forward operation, shafts 11 and 13 rotate in the same direction, or forwardly. Pump 15 draws oil from sump 18 and delivers the same under pressure to control 14 through check valve 21 and passage 26 and to chamber 29 of valve unit 28 through passage 27. Large valve 42 will be seated upon seat 41. Assuming that the vehicle is standing still with the engine running, the pressure delivered to chamber 29 will be of the order of 40 to 75 pounds per square inch. Spring 50 is calibrated such that with a predetermined differential pressure, for example 68 pounds per square inch between that existing in chambers 29 and 39 the valve 46 will open. If the differential pressure between these two chambers is less than this predetermined differential pressure, the valve 46 will be closed. With the vehicle standing still, rear pump 16 will not be driven and will not supply pressure to passage 31. Valve 46 will momentarily open to permit flow of fluid from chamber 29 to chamber 39 and to passage 31. Upon a rise in pressure in chamber 39 to a pressure such that the differential pressure between chambers 29 and 39 becomes less than the predetermined pressure differential, for example, 68 pounds per square inch, valve 46 will close. When operating in forward drive, pump 16 is effective to deliver pressure to passage 31 to maintain a differential pressure between chambers 29 and 39 of less than 68 pounds per square inch such that valve 46 will be maintained in its closed position. The initial charge of fluid delivered to passage 31 from pump 15 when the vehicle is standing still with the engine running primes governor 17 and pump 16 and prevents gear clatter in pump 16 and governor rattle when the vehicle is first started in motion. As soon as the pressure in chamber 39 rises a sufficient amount to render the differential pressure between chambers 29 and 39 less than 68 pounds per square inch, valve 46 will close, whether pump 16 is operating in forward drive or is standing still. This permits the rear pump 16 and governor 17 to initially be charged with fluid when the vehicle is standing still and at the same time prevents fluid from continuously being supplied to passage 31 by the front pump 15 when the vehicle is standing still. As the vehicle gains forward motion, rear pump 16 will deliver sufficient pressure to chamber 39 to force large valve 42 off of seat 41 such that rear pump pressure is supplied to chamber 29 and passage 27. This pressure, at some vehicle speed will be sufficient to close check valve 21 and rear pump oil only will be supplied to passage 26. Front pump 15 will then simply recirculate oil through a pressure relief valve, not shown.

In reverse operation, pump 16 will rotate in reverse and tend to rob oil from passage 31 and deliver the same to passage 30. However, as heretofore stated, when operating in reverse, the front pump 15 is controlled to deliver pressure of the order of 75 to 140 pounds per square inch to chamber 29. This rise in pressure in chamber 29 will cause valve 46 to open and admit fluid to chamber 39 and passage 31. As soon as the differential pressure in chambers 29 and 39 becomes less than 68 pounds per square inch, valve 46 will again seat. This will quickly happen since pump 16 presents a restriction to fluid flow from passage 31 to 30 through the pump. The flow of fluid from chamber 29 to 39 through valve 46 is intermittent and not a continuous flow. In the event that the transmission is shifted from neutral to reverse there may be an initial momentary drop of pressure in passage 27 and chamber 29 due to the fluid requirements of the transmission. Such momentary drop in pressure in chamber 29 may particularly occur at engine idle speed as is normal at the time shift to reverse is accomplished. Valve 46 will be closed by spring 50 to initially block off flow of fluid to chamber 39 to thereby prevent robbing of fluid from pump 15 at such times that pump 15 is driven at speeds such that the pump is unable to maintain a predetermined pressure differential between chambers 29 and 39. Since the pump and governor are disposed in the sump chamber of sump 18 above the level of fluid in the sump, it is practical and permissible to manufacture these items with loose tolerance fit of their component parts. When operating in forward drive any oil which leaks out merely returns to the sump. The arrangement described permits the use of inexpensive pumps and governors, thereby reducing cost and provides a practical and inexpensive solution to the problem of gear clatter and fluid aeration which accompany the use of such inexpensive pumps and governors. The valve unit 28 permits fluid flow from passage 31, through chamber 39, valve member 42, chamber 29 and passage 27 to passage 26 when pump 16 is rotated in a forward direction. Check valve 21 will be closed. It will be noted that head 45a of valve 46 is of much greater diameter than stem 45 and conical valve surface 45b.

In the closed position of valve 46, head 45a is spaced from surface 42b of valve 42 due to contact of conical valve surface 45b with the sharp corner of drilled opening 42a in valve 42. While the large diameter head 45a is not essential to the opening and closing of valve 46, it has been found to be advantageous in that it prevents hunting or buzzing of the valve and provides a snap action of the valve with positive closing and opening action. When the valve opens to permit fluid flow from chamber 29 to chamber 39, fluid flow past conical valve surface 45b strikes the undersurface of head 45a and assists in maintaining the valve in an open position such that rapid opening and closing or "hunting" is prevented. Oil flow is radially outwardly between surface 42b and the undersurface of head 45a, and this fluid flow prevents momentary valve buzz as otherwise occurs if the large head is omitted. When operating in reverse, pressure delivered to chamber 29 by pump 15 acting on stem 45 may open valve member 46 to permit fluid flow from chamber 29 to chamber 39. In the event that the pressure differential between chambers 29 and 39 is less than 68 pounds, valve 46 will be closed by spring 50. Valve 46 therefore serves to provide an additional prime to pump 16 during continuous operation in reverse whenever pump 15 delivers sufficient pressure to chamber 29 to open valve 46.

We claim:

1. In a fluid pressure supply system, a first pump, a drive member for alternately driving said pump in forward and reverse directions, respectively, a suction passage and a pressure delivery passage for said pump, a second pump, a suction passage and a pressure delivery passage for said second pump, a valve unit connected to both of said delivery passages, valve means in said unit for permitting fluid flow from said first pump delivery passage to said second pump delivery passage when said first pump is driven in a forward direction, and valve means in said unit for controlling fluid flow from said second pump delivery passage to said first pump delivery passage when said first pump is driven in said reverse direction, said last-mentioned valve means being responsive to pressure delivered by said second pump to said second pump delivery passage to permit fluid flow from said second pump delivery passage to said first pump delivery passage and responsive to pressure rise in said first pump delivery passage to block off further flow of fluid from said second pump delivery passage to said first pump delivery passage.

2. In a fluid pressure supply system, a first pump, a driving member for alternately driving said pump in opposite directions of rotation, a suction passage, a pressure delivery passage for delivering fluid drawn by said pump through said suction passage during rotation of said pump in one direction of rotation thereof, a second pump effective to deliver fluid to a second delivery passage, a valve unit having a first chamber connected to said first-mentioned delivery passage and a second chamber connected to said second delivery passage, said valve unit including first and second valves for controlling fluid flow between said chambers, said first valve being movable in response to fluid pressure in said first chamber to permit fluid flow from said first-mentioned to said second chamber upon rotation of said first pump in said one direction of rotation, said second valve being movable in response to pressure in said second chamber to permit fluid flow from said second chamber to said first-mentioned chamber upon rotation of said first pump in the opposite direction of rotation from said one direction of rotation, said second valve being movable upon a predetermined rise in pressure in said first chamber to block off fluid flow from said second to said first-mentioned chamber during rotation of said first pump in the opposite direction of rotation from said one direction of rotation.

3. In a fluid pressure supply system, a pump, a driving member for driving said pump in opposite directions of rotation, a suction passage, a delivery passage for fluid drawn by said pump through said suction passage during rotation of said pump in one direction of rotation thereof, a second pump adapted to deliver fluid under pressure to a second delivery passage, a valve unit having a first chamber connected to said first-mentioned delivery passage and a second chamber connected to said second pressure delivery passage, a first and second valve in said valve unit, the fluid pressure delivered to said first chamber by said first-mentioned pressure delivery passage applying a thrust to said first and second valves tending to open said first valve and close said second valve, and the fluid pressure delivered to said second chamber through said second pressure delivery passage tending to close said first valve and open said second valve.

4. In a fluid pressure supply system,
a first pump,
a driving member for alternately driving said pump in forward and reverse directions respectively,
a suction passage for said pump,
a delivery passage for said pump adapted to receive fluid under pressure from said pump when said pump is driven in a forward direction,
a second pump,
a suction passage for said second pump,
a pressure delivery passage adapted to receive fluid under pressure from said second pump,
a valve unit comprising a housing having a first chamber hydraulically connected to said first pump delivery passage and a second chamber hydraulically connected to said second pump delivery passage,
movable means within said housing effective in a closed position to prevent fluid flow from either one of said chambers to the other of said chambers,
said movable means including a first valve extending transverse of said housing intermediate said first and second chambers and having an opening therethrough,
said movable means also including a second valve supported upon said first valve for controlling fluid flow through said opening,
spring means yieldably biasing said first valve to said closed position,
and additional spring means yieldably biasing said second valve to said closed position,
said first valve being movable upon a predetermined rise of pressure in said first chamber to permit fluid flow from said first to said second chamber when said first pump is driven in said forward direction,
said second valve being movable in response to a predetermined rise in pressure in said second chamber to permit fluid flow from said second chamber and to said second pump delivery passage when said second pump is driven in said reverse direction.

5. In a fluid pressure supply system, a first pump, a drive member for alternately driving said pump in forward and reverse directions, respectively, a suction line and a first pressure delivery line for fluid drawn by said pump through said suction line during drive of said pump in said forward direction, a second pump, a drive member for driving said second pump at variable speeds of rotation, a suction line and a pressure delivery line for said second pump, a valve unit for controlling flow of fluid between said pressure delivery lines, said valve unit including a housing, a first chamber in said housing connected to the pressure delivery line of said first pump, a second chamber connected to the delivery line of said second pump, a first check valve in said housing, means yieldably biasing said check valve to block off flow of fluid from said first to said second chamber, said first check valve being movable in response to a predetermined excess of pressure in said first chamber above the pressure in said second chamber to permit fluid flow from said first pump discharge passage to said second pump discharge passage upon rotation of said first pump in said forward direction, a second check valve in said housing for controlling the flow of fluid from the delivery line of said second pump to said first pump delivery line, means yieldably biasing said second check valve to block flow of fluid from said second chamber to said first chamber to maintain the prime in said second pump at low speeds of rotation of said second pump, said second check valve being movable in response to a predetermined excess of pressure in said second chamber above that in said first chamber to deliver fluid from said second chamber to said first chamber to prime said first pump upon rotation of said first pump in reverse.

6. In a fluid pressure supply system, a first pump, a drive member for alternately driving said pump in forward and reverse directions, respectively, a suction line and a first pressure delivery line for fluid drawn by said pump during operation of said pump in said forward direction, a second pump, a drive member for driving said second pump, a suction line and a pressure delivery line for said second pump, a valve unit hydraulically connected to each of said delivery lines for controlling fluid flow between said lines, a first check valve in said unit, means normally biasing said check valve to block off fluid flow from said first pump delivery line to said second pump delivery line, said check valve being movable in response to a predetermined pressure, differential excess of pressure in said first delivery line over that in said second pressure delivery line to permit fluid flow from said first to said second pressure delivery line upon rotation of said first pump in said forward direction, a second check valve in said valve unit for controlling fluid flow from the delivery passage of said second pump to said first-mentioned delivery passage, means yieldably biasing said second check valve to block off fluid flow from said second pump delivery passage to maintain the prime of said second pump at low speeds of rotation of said second pump, said second check valve being movable in response to a predetermined excess of pressure in said second pump discharge passage over that in said first-mentioned discharge passage to deliver fluid from said second pump to said first pump to prime said first pump when said first pump is driven in reverse.

7. In a fluid pressure supply system, a first pump, a drive member for alternately driving said pump in forward and reverse directons, respectively, a suction passage and first pressure delivery passage for fluid drawn by said pump through said suction passage during drive of said pump in said forward direction, a second pump, a drive member for driving said second pump at variable speeds of rotation, a suction passage and a pressure delivery passage for said second pump, a valve unit for controlling flow of fluid between said pressure delivery passages, said valve unit including a housing having a first chamber connected to said first pressure delivery passage and a second chamber connected to said second delivery passage, a first valve for controlling fluid flow from said first chamber, means yieldably biasing said first valve to a closed position to prevent fluid flow from said first to said second chamber, said first valve being movable in response to a predetermined pressure differential in said chambers to permit fluid flow from said first chamber to said second chamber to hydraulically connect said first pressure delivery passage to said second pressure delivery passage when said first pump is driven in said forward direction, a second valve disposed between said chambers effective when both of said valves are closed to prevent fluid flow from said second chamber to said first chamber, means yieldably biasing said second valve to a closed position, said second valve being movable in response to a predetermined pressure differential in said chambers to an open position to permit fluid flow from said second chamber to said first chamber and to said first pressure delivery passage to maintain a positive pressure head in said first pressure delivery passage upon drive of said first pump in reverse.

8. In a fluid pressure supply system, a first pump, a drive member for alternately driving said pump in forward and reverse directions, respectively, a suction passage and a first pressure delivery passage for fluid drawn by said pump through said suction passage upon drive of said pump in said forward direction, a second pump, a drive member for driving said second pump at variable speeds of rotation, a suction passage and a pressure delivery passage for said second pump, a valve unit for controlling flow of fluid between said pressure delivery passages, said valve unit including a housing having a first chamber connected to said first pressure delivery passage, a second chamber connected to the pressure delivery passage of said second pump and spaced from said first chamber, means in said housing effective when closed to block any fluid flow between said chambers, said means including a first movable valve member extending transversely across said housing between said chambers, an opening through said valve member, a second valve member supported upon said first valve member for controlling fluid flow through said opening in said first valve member, means associated with each of said valve members for positioning said valve members to block off fluid flow between said chambers to prevent loss of prime of said second pump when said second pump is rotated at low speeds of rotation, said first valve member being movable to an open position to permit fluid flow from said first chamber to said second chamber in response to a predetermined excess of pressure in said first chamber above that in said second chamber when said first pump is driven in said forward direction, said second valve being movable to an open position to permit fluid flow from said second chamber to said first chamber through said opening in said first valve in response to a predetermined excess of pressure in said second chamber above that in said first chamber to deliver fluid to said first pump discharge passage for maintaining fluid pressure in said first pump when said first pump is driven in reverse.

References Cited in the file of this patent
UNITED STATES PATENTS

| | | |
|---|---|---|
| 2,884,813 | Kelley | May 5, 1959 |
| 2,908,181 | Smirl | Oct. 13, 1959 |
| 2,910,942 | Thorman | Nov. 3, 1959 |
| 3,006,148 | Hause | Oct. 31, 1961 |